United States Patent
Crandall (10) Patent No.: US 9,587,733 B2
(45) Date of Patent: Mar. 7, 2017

(54) MULTI-PIECE GEAR SHIFT KNOBS AND GEAR SHIFT LEVER ASSEMBLIES COMPRISING THE SAME

(71) Applicant: Toyota Motor Engineering & Manufacturing North America, Inc., Erlanger, KY (US)

(72) Inventor: Bryan P. Crandall, Tecumseh, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 592 days.

(21) Appl. No.: 13/622,560

(22) Filed: Sep. 19, 2012

(65) Prior Publication Data

US 2014/0076084 A1 Mar. 20, 2014

(51) Int. Cl.
*F16H 59/02* (2006.01)
*G01G 1/06* (2006.01)
*G05G 1/06* (2006.01)

(52) U.S. Cl.
CPC ............ *F16H 59/0278* (2013.01); *G05G 1/06* (2013.01); *Y10T 29/49826* (2015.01); *Y10T 74/2014* (2015.01); *Y10T 74/20612* (2015.01)

(58) Field of Classification Search
CPC ......... Y10T 74/20624; Y10T 74/20612; Y10T 74/20738; Y10T 74/20732; Y10T 74/2014; Y10T 74/2084; Y10T 74/20762; Y10T 74/20582; Y10T 74/20828; G05G 1/10; G05G 1/06; G05G 1/04; F16H 59/0278; F16H 2059/0282; F16H 2059/0286
See application file for complete search history.

(56) References Cited

U.S. PATENT DOCUMENTS

| | | | | |
|---|---|---|---|---|
| 574,755 A | * | 1/1897 | Oehler | A47J 45/074 16/433 |
| 604,224 A | * | 5/1898 | Bennik | F16L 37/1215 285/148.19 |
| 1,082,993 A | * | 12/1913 | Beattie | F16L 19/0231 411/433 |
| 1,142,629 A | * | 6/1915 | Roush et al. | G05G 1/12 403/233 |
| 1,257,799 A | * | 2/1918 | Brown | G05G 1/12 16/422 |
| 2,182,007 A | | 12/1939 | Tegarty | |
| 2,377,581 A | * | 6/1945 | Shaffrey | F16B 37/0892 411/433 |

(Continued)

FOREIGN PATENT DOCUMENTS

GB 2296060 A * 6/1996 .......... F16B 37/0821

*Primary Examiner* — Daniel Yabut
(74) *Attorney, Agent, or Firm* — Dinsmore & Shohl LLP (57) ABSTRACT

A multi-piece gear shift knob and a gear shift lever assembly including the same are disclosed. The multi-piece gear shift knob includes a grip portion and a lock portion. The grip portion includes an installation opening that extends through at least one face of the grip portion, and a partial thread form. The lock portion includes a partial thread form. The grip portion and the lock portion include corresponding attachment features such that when the lock portion is installed into the installation opening, the attachment features of the grip portion and the lock portion couple the lock portion to the grip portion.

16 Claims, 7 Drawing Sheets

(56) References Cited

U.S. PATENT DOCUMENTS

| | | | |
|---|---|---|---|
| 4,274,323 A * | 6/1981 | Resnicow | F16B 43/007 411/427 |
| 4,462,731 A * | 7/1984 | Rovinsky | F16B 37/0892 269/173 |
| 4,791,826 A | 12/1988 | Behrens | |
| 4,896,556 A | 1/1990 | Takada | |
| 4,930,961 A * | 6/1990 | Weis | 411/266 |
| 4,991,461 A | 2/1991 | Sennett et al. | |
| 5,000,640 A * | 3/1991 | Haas, Jr. | F16B 23/0061 411/409 |
| 5,284,400 A | 2/1994 | Thomas | |
| 5,305,660 A | 4/1994 | Hasegawa | |
| 5,413,008 A * | 5/1995 | Brock | 74/18 |
| 5,596,894 A * | 1/1997 | Lee | 70/201 |
| 5,806,378 A | 9/1998 | Friedman | |
| 5,900,603 A * | 5/1999 | Brush | 74/553 |
| 6,058,797 A | 5/2000 | Konig et al. | |
| 6,421,881 B1 | 7/2002 | Shovlin | |
| 6,513,406 B1 * | 2/2003 | Murray et al. | 74/523 |
| 2004/0194568 A1 * | 10/2004 | Ply et al. | 74/473.29 |
| 2006/0107781 A1 * | 5/2006 | Yao | 74/523 |
| 2007/0137416 A1 * | 6/2007 | Mowzoun | 74/558.5 |
| 2008/0173126 A1 * | 7/2008 | Madden | B62J 33/00 74/551.9 |

* cited by examiner

MULTI-PIECE GEAR SHIFT KNOBS AND GEAR SHIFT LEVER ASSEMBLIES COMPRISING THE SAME

TECHNICAL FIELD

The present specification generally relates to shift knobs for vehicles and, more specifically, multi-piece gear shift knobs for vehicles that ease assembly of the gear shift knob onto a threaded gear shift lever of a transmission.

BACKGROUND

Gear shift knobs allow drivers of vehicles to comfortably grasp and shift the position of gear shift levers to change engagement of a gear of a transmission. Gear shift levers conventionally include elongate members that extend from the transmission or a gear selection unit. The gear shift levers are often threaded to allow for secured positioning of the gear shift knob to the gear shift lever.

Assembly of the gear shift knob to the gear shift lever generally occurs during final vehicle assembly, after interior trim panels of the vehicle have been installed. To install a gear shift knob onto a threaded gear shift lever, an installer positions himself in the vehicle interior and manually advances the gear shift knob along the threads of the gear shift lever. Because of the positioning of the components of the vehicle at the time of installation of the gear shift knob, along with the shape of the gear shift knob itself, the installer of the gear shift knob may not be able to use power tools to assist with the assembly. In addition, because of a requirement to maintain surface finish of the gear shift knob, the installer of the gear shift knob may not be able to use manual tools as well. Further, because of the position of the components of the vehicle, the installer may have difficulty in manually advancing the gear shift knob along the threaded gear shift lever in an ergonomically preferred operation.

Accordingly, a need exists for gear shift knobs that install onto threaded gear shift levers and methods of assembling gear shift knobs onto threaded gear shift levers.

SUMMARY

In one embodiment, a multi-piece gear shift knob includes a grip portion and a lock portion. The grip portion includes an installation opening that extends through at least one face of the grip portion, and a partial thread form. The lock portion includes a partial thread form. The grip portion and the lock portion include corresponding attachment features such that when the lock portion is installed into the installation opening, the attachment features of the grip portion and the lock portion couple the lock portion to the grip portion.

In another embodiment, a gear shift lever assembly for a vehicle includes a gear shift lever extending from a transmission gear selector unit, where the gear shift lever having a threaded portion. The gear shift lever assembly also includes a multi-piece gear shift knob coupled to the gear shift lever. The multi-piece gear shift knob includes a grip portion having an installation opening extending through at least one face of the grip portion and a partial thread form. The multi-piece gear shift knob also includes a lock portion positioned within the installation opening of the grip portion. The lock portion includes a partial thread form. The multi-piece gear shift knob also includes a plurality of corresponding attachment features positioned on the grip portion and the lock portion such that when the lock portion is installed into the installation opening, the attachment features of the grip portion and the lock portion couple the lock portion to the grip portion.

In yet another embodiment, a method of installing a multi-piece gear shift knob onto a gear shift lever includes positioning a grip portion of the multi-piece gear shift knob onto the gear shift lever, such that a partial thread form of the grip portion is aligned with a threaded portion of the gear shift lever. The method also includes positioning a lock portion of the multi-piece gear shift knob proximate to an installation opening of the grip portion, and translatingthe lock portion towards the grip portion such that corresponding attachment features of the grip portion and the lock portion interlock to coupled the lock portion to the grip portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
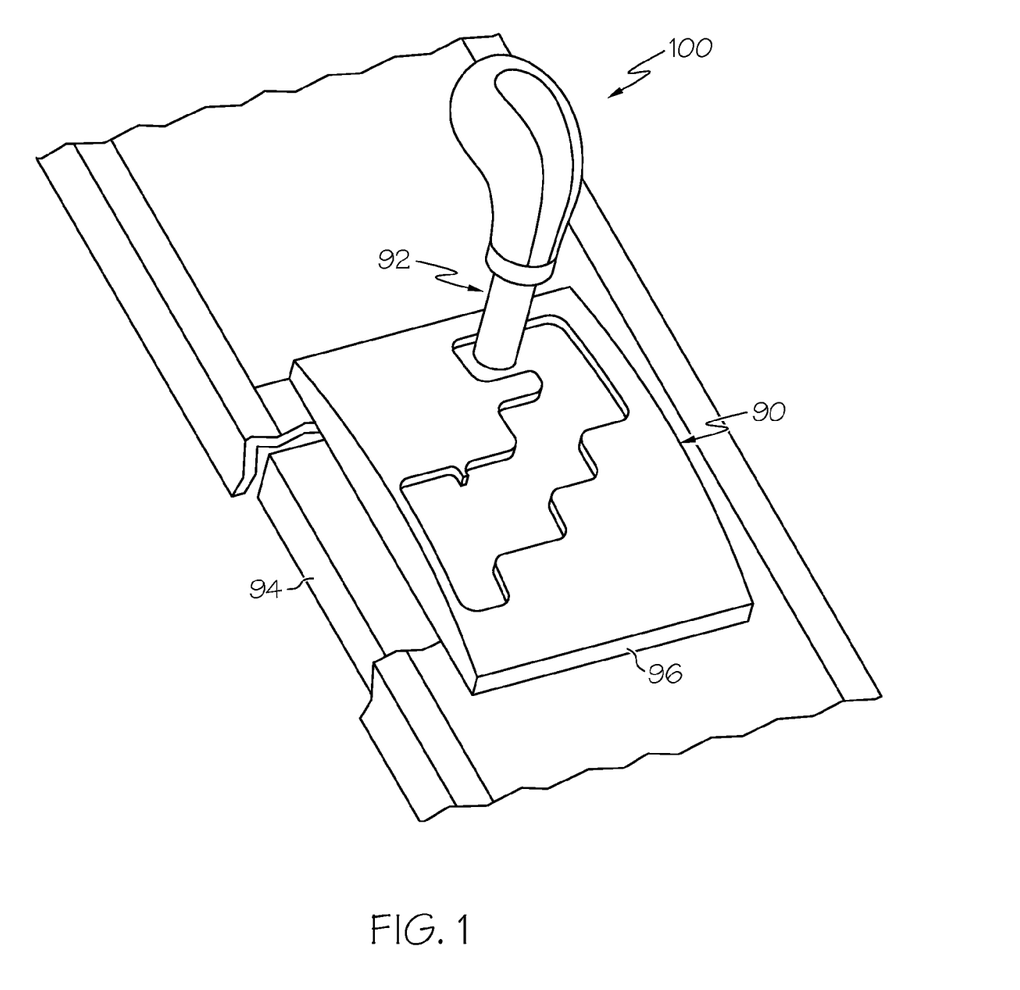
FIG. 1 schematically depicts an interior of a vehicle according to one or more embodiments shown or described herein.

FIG. 1 generally depicts a transmission gear shifter of a motor vehicle. The gear shifter includes a shift knob which a driver of the vehicle grips when moving the gear shift lever between detents in a shift gate. Each of the detents of the shift gate corresponds to a gear selection of the transmission such that the gear shift lever, directly or indirectly, selects the operating condition of the transmission of the vehicle. In certain embodiments, the gear shift lever is threaded at positions distal from the shift gate. The threaded portion of the gear shift lever allows for secure attachment of the shift knob to the gear shift lever.

Multi-piece gear shift levers according to the present disclosure include a grip portion and a lock portion each having a partial thread form. The grip portion and the lock portion include corresponding attachment features that interlock the grip portion and the lock portion. The grip portion and the lock portion may be positioned separately relative to the gear shift lever and attached to one another to form an interrupted thread form that secures the multi-piece gear shift knob to the gear shift lever. The multi-piece gear shift knob may minimize the amount of rotation required to secure the multi-piece gear shift knob to the threaded gear shift lever. Multi-piece gear shift knobs and methods of installing the multi-piece gear shift knobs will be described in more detail in reference to the appended drawings.

Referring to FIG. 1, a portion of an interior of a motor vehicle is depicted. The motor vehicle includes a gear shift lever assembly 90 having a transmission gear selector unit 94, a shift gate 96, and a gear shift lever 92 that extends from the transmission gear selector unit 94 and is moved through the detents of the shift gate 96 by the drive of the vehicle. A multi-piece gear shift knob 100 is coupled to the gear shift lever 92. The gear shift lever 92 may provide a comfortable grip for the driver of the vehicle when selecting gears through the transmission gear selector unit 94. In the embodiment depicted in FIG. 1, the transmission gear selector unit 94 selects gears in an automatic transmission. However, it should be understood that multi-piece gear shift knobs 100 according to the present disclosure may be used with vehicles having standard transmissions, constant variable transmissions, and the like. Further, while the transmission gear selector unit 94 is depicted in FIG. 1 as being positioned relative to a center console of a vehicle, it should be understood that multi-piece gear shift knobs 100 according to the present disclosure may be used with vehicles having transmission gear selector units 94 mounted proximate to the steering column, the dash board, and the like.

Figure 2:
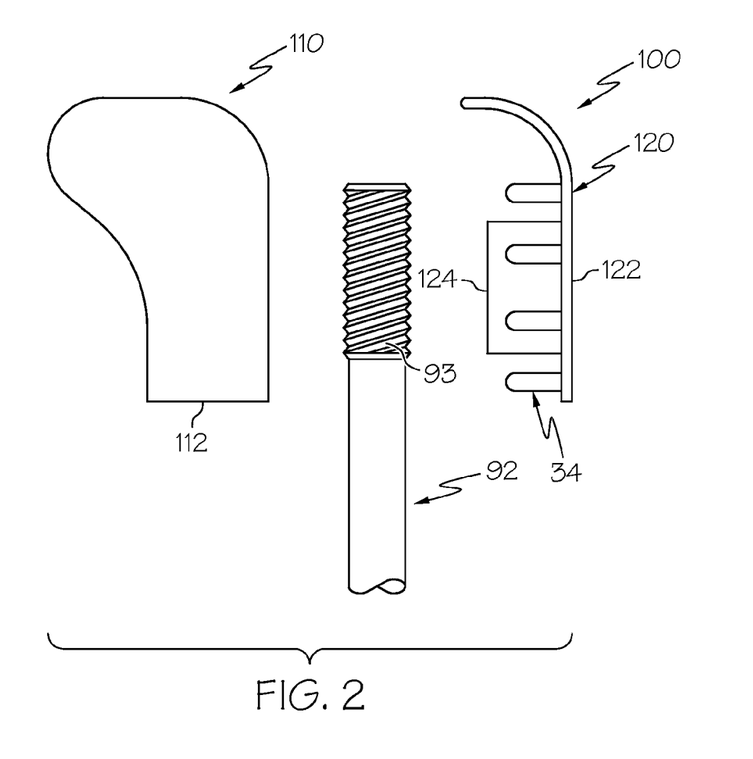
FIG. 2 schematically depicts an exploded side view of a multi-piece gear shift knob and a threaded gear shift lever according to one or more embodiments shown or described herein.

Referring now to FIG. 2, an exploded view of the multi-piece gear shift knob 100 is depicted along with the gear shift lever 92 having a threaded portion 93. The multi-piece gear shift knob 100 includes a grip portion 110 and a lock portion 120. The grip portion 110 includes grip body portion 112. The lock portion 120 includes lock body portion 122, a partial thread form 124, and a plurality of attachment features 34 that extend from the lock body portion 122. As depicted in FIG. 2, the grip portion 110 and the lock portion 120 are positioned in an un-installed condition, where the lock portion 120 is spaced apart from the grip portion 110, and spaced apart from the threaded portion 93 of the gear shift lever 92.

Figure 3:
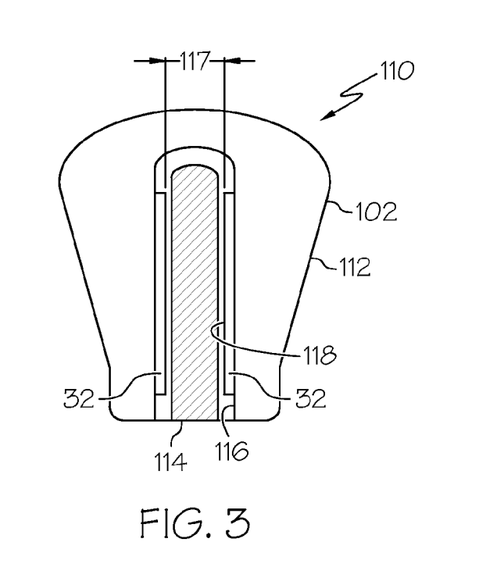
FIG. 3 schematically depicts a rear view of a grip portion of a multi-piece gear shift knob according to one or more embodiments shown or described herein.

Referring now to FIG. 3, the grip portion 110 is shown in greater detail. The grip portion 110 includes an installation opening 116 passing through an external face 102. The grip portion 110 includes a partial thread form 114. As used herein, a partial thread form 114, 124 refers to a partial thread that extends an arc-length less than complete circumference, such that the partial thread extends across a portion of a circumference less than a whole circumference. In the embodiment depicted in FIG. 3, the partial thread form 114 is integrated into the grip body portion 112 and oriented such that the partial thread form 114 is viewable through the installation opening 116 of the grip portion 110. The grip portion 110 further includes attachment features 32 integrated into the grip portion 110 within the installation opening 116. In the embodiment depicted in FIG. 3, the attachment features 32 include a throat 118 having a throat dimension 117. As depicted, the throat 118 is positioned inside of the installation opening 116, such that the throat dimension 117 is smaller than the dimension of the installation opening 116.

Figure 4:
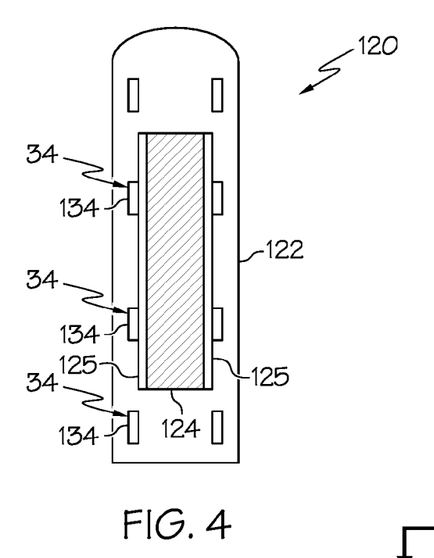
FIG. 4 schematically depicts a front view of a lock portion of a multi-piece gear shift knob according to one or more embodiments shown or described herein.

Referring now to FIG. 4, the lock portion 120 is shown in greater detail. The lock portion 120 includes the partial thread form 124, which extends an arc length less than complete circumference and terminates at an arc end 125 (e.g., two arc ends 125). As depicted in FIG. 4, the partial thread form 124 is integrated into the lock body portion 122. The lock portion 120 also includes a plurality of attachment features 34. The attachment features 34 of the lock portion 120 depicted in FIG. 4 include a plurality of flexible tabs 134 that extend from the lock body portion 122. The lock portion 120 is sized and shaped to fit inside the installation opening 116 of the grip portion 110 (as shown in FIG. 3), such that the lock portion 120 extends across the installation opening 116 of the grip portion 110. The attachment features 34 of the lock portion 120 and the attachment features 32 of the grip portion 110 are positioned such that the attachment features 32, 34 interlock one another when the lock portion 120 is installed into position with the grip portion 110, as will be described in greater detail below. The attachment features 32, 34 of the grip portion 110 and the lock portion 120 form a non-releasable attachment between the grip portion 110 and the lock portion 120 that cannot be readily disassembled when the multi-piece gear shift knob 100 is installed on a gear shift lever 92 without specialized tools.

Figure 5:
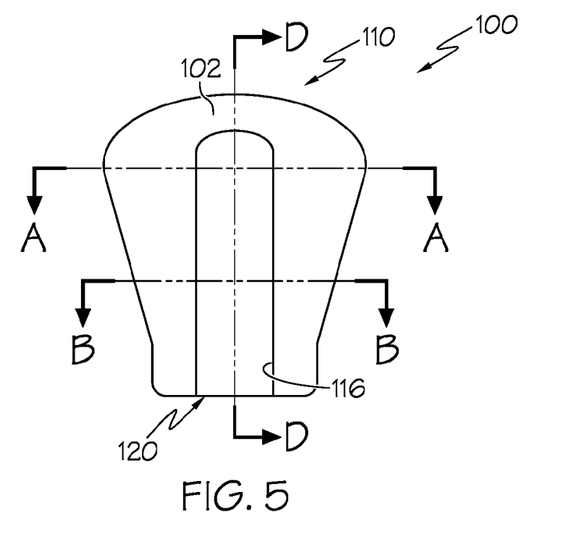
FIG. 5 schematically depicts a rear view of a multi-piece gear shift knob according to one or more embodiments shown or described herein.

Referring now to FIG. 5, the lock portion 120 is inserted into the installation opening 116 of the grip portion 110 such that the lock portion 120 and the grip portion 110 form the multi-piece gear shift knob 100. The attachment features 32, 34 of the grip portion 110 and the lock portion 120 engage with one another such that the lock portion 120 is coupled to the grip portion 110, thereby forming the multi-piece gear shift knob 100. As depicted in FIG. 5, the lock portion 120 and the installation opening 116 of the grip portion 110 may be sized and shaped such that spacing between lock portion 120 and the grip portion 110 are minimized, as to enhance the visual appearance of the multi-piece gear shift knob 100.

Figure 6:
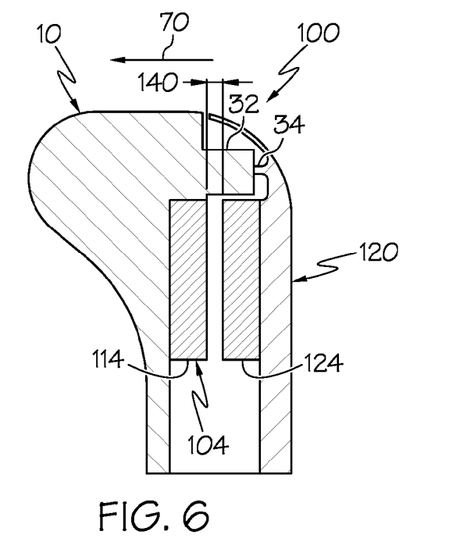
FIG. 6 schematically depicts a side sectional view of a multi-piece gear shift knob along line D-D of FIG. 5 according to one or more embodiments shown or described herein.

A generic embodiment of the multi-piece gear shift knob 100 is depicted in FIG. 6. As depicted in this embodiment, the grip portion 110 includes a partial thread form 114 and the lock portion 120 includes a partial thread form 124. The lock portion 120 is aligned relative to the grip portion 110 by, for example, the attachment features 32, 34 of the grip portion 110 and the lock portion 120, respectively, such that the partial thread form 114 of the grip portion 110 is aligned with the partial thread form 124 of the lock portion 120. The alignment of the partial thread forms 114, 124 forms an interrupted thread form 104 having a gap 140 provided between the partial thread form 114 of the grip portion 110 and the partial thread form 124 of the lock portion 120. The interrupted thread form 104 interfaces with the threaded portion 93 of the gear shift lever 92 (shown in FIG. 2) to secure the multi-piece gear shift knob 100 to the gear shift lever 92.

To install the multi-piece gear shift knob 100 onto the gear shift lever 92, the grip portion 110 is positioned such that the partial thread form 114 of the grip portion 110 is positioned proximate to the threaded portion 93 of the gear shift lever 92. With the grip portion 110 positioned relative to the gear shift lever 92, the lock portion 120 is brought towards the grip portion 110 and aligned, for example by aligning the corresponding attachment features 32, 34 of the grip portion 110 and the lock portion 120. The lock portion 120 is translated towards the grip portion 110 in the installation direction 70 such that the attachment features 34 of the lock portion 120 interlock with the corresponding attachment features 32 of the grip portion 110. The corresponding attachment features 32, 34 maintain alignment of the lock portion 120 to the grip portion 110 such that the partial thread form 124 of the lock portion 120 is aligned with the partial thread form 114 of the grip portion 110 to form the interrupted thread form 104.

With the lock portion 120 coupled to the grip portion 110, the multi-piece gear shift knob 100 may be adjusted in position relative to the gear shift lever 92. The multi-piece gear shift knob 100 may be advanced along the threaded portion 93 of the gear shift lever 92 to adjust the vertical position of the multi-piece gear shift knob 100 relative to the gear shift lever 92, as well as to adjust the clocking orientation of the multi-piece gear shift knob 100 relative to the gear shift lever 92. By installing the lock portion 120 to the grip portion 110 with the partial thread forms 114, 124 at least partially installed on the threaded portion 93 of the gear shift lever 92, the multi-piece gear shift knob 100 may reduce the time of installation of the multi-piece gear shift knob 100 onto the gear shift lever 92 as compared to conventional designs having an un-interrupted thread form. Further, because advancing shift knobs along threaded portions 93 of gear shift levers 92 may be an ergonomically difficult action for an installer, the multi-piece gear shift knob 100 may also reduce the human factors burdens placed on installers.

Because the attachment features 32, 34 of the grip portion 110 and the lock portion 120 are positioned away from the exterior faces of the multi-piece gear shift knob 100, the likelihood of inadvertent separation of the lock portion 120 from the grip portion 110 after installation is minimized, thereby reducing the likelihood that the multi-piece gear shift knob 100 can be removed from the gear shift lever 92 through a directional application of force, for example by a drive pulling upwards on the multi-piece gear shift knob 100. Instead, the multi-piece gear shift knob 100 may be removed from the gear shift lever 92 by advancing the multi-piece gear shift knob 100 along the threaded portion 93 of the gear shift lever 92. Thus, multi-piece gear shift knobs 100 according to the present disclosure may be quickly and easily installed by coupling the lock portions 120 to the grip portions 110 after the grip portions 110 are positioned relative to the gear shift levers 92. Such multi-piece gear shift knobs 100 may also be removed from the gear shift levers 92 without specialized tooling.

Figure 7:
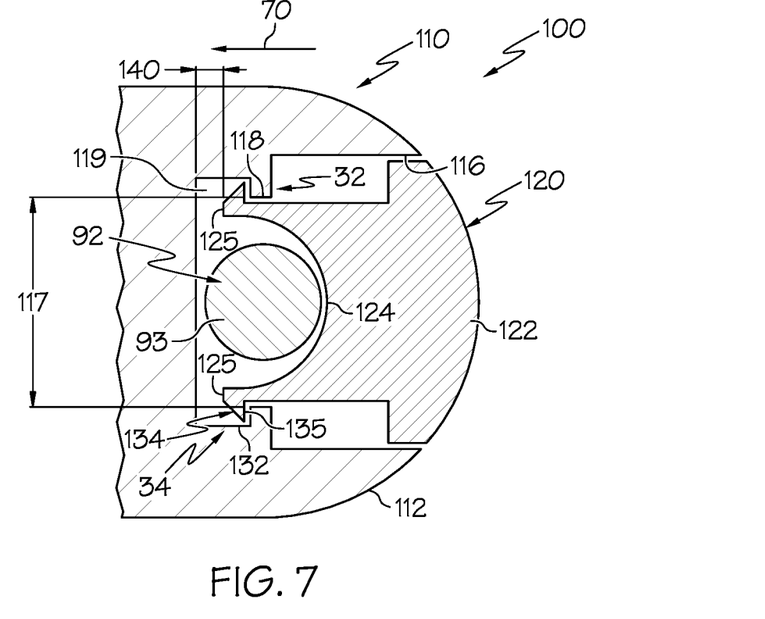
FIG. 7 schematically depicts a top sectional view of a multi-piece gear shift knob along line A-A of FIG. 5 according to one or more embodiments shown or described herein.
Figure 8:
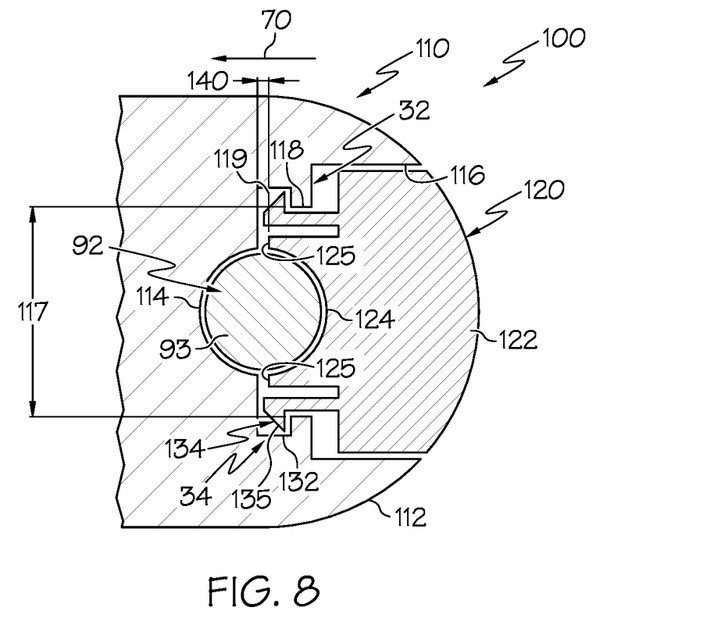
FIG. 8 schematically depicts a top sectional view of a multi-piece gear shift knob along line B-B of FIG. 5 according to one or more embodiments shown or described herein.

Referring now to FIGS. 7-11, embodiments of the multi-piece gear shift knob 100 are depicted having a variety of attachment features 32, 34 of the grip portion 110 and the lock portion 120, respectively. Referring to FIGS. 7 and 8, one embodiment of the multi-piece gear shift knob 100 is depicted as installed on a threaded portion 93 of a gear shift lever 92. In this embodiment, the attachment features 34 of the lock portion 120 include resilient, flexible tabs 134 that extend from the lock body portion 122. The flexible tabs 134 of the lock portion 120 include a barb 135 that provides engagement with the attachment feature 32 of the grip portion 110. The attachment features 32 of the grip portion 110 include a rib 132 that extends away from the installation opening 116. The ribs 132 of the attachment feature 32 define a throat 118 having a throat dimension 117. The region of the grip body portion 112 spaced inside of the throat 118 include a relief zone 119 spaced outside of the throat 118.

In the embodiment depicted in FIGS. 7 and 8, when the lock portion 120 is positioned inside the installation opening 116 of the grip portion 110 and translated in the installation direction 70, the flexible tabs 134 of the lock portion 120 are deflected inwards by the throat 118, such that the barbs 135 on the flexible tabs 134 deflect to a position inside of the throat 118. As the lock portion 120 is translated in the installation direction 70, the barbs 135 are held inside of the throat dimension 117 until the barbs 135 pass into the relief zone 119. Once the barbs 135 are positioned in the relief zone 119, the flexible tabs 134 deflect away from the lock body portion 122 in a direction towards the unconstrained state of the flexible tabs 134. With the barbs 135 positioned in the relief zone 119 such that the attachment features 34 of the lock portion 120 are positioned outwards from the throat dimension 117, the lock portion 120 is coupled to the grip portion 110. Further, with the lock portion 120 coupled to the grip portion 110, the partial thread forms 114, 124 of the grip portion 110 and the lock portion 120 are aligned to form the interrupted thread form 104 having the gap 140 provided between the arc end 125 of the partial thread form 124 of the lock portion 120 and the partial thread form 112 of the grip potion 110. By installing the lock portion 120 into the grip portion 110 subsequent to positioning the grip portion 110 relative to the gear shift lever 92, the interrupted thread form 104 is positioned relative to the threaded portion 93 of the gear shift lever 92 and couples the multi-piece gear shift knob 100 relative to the gear shift lever 92.

Figure 9:
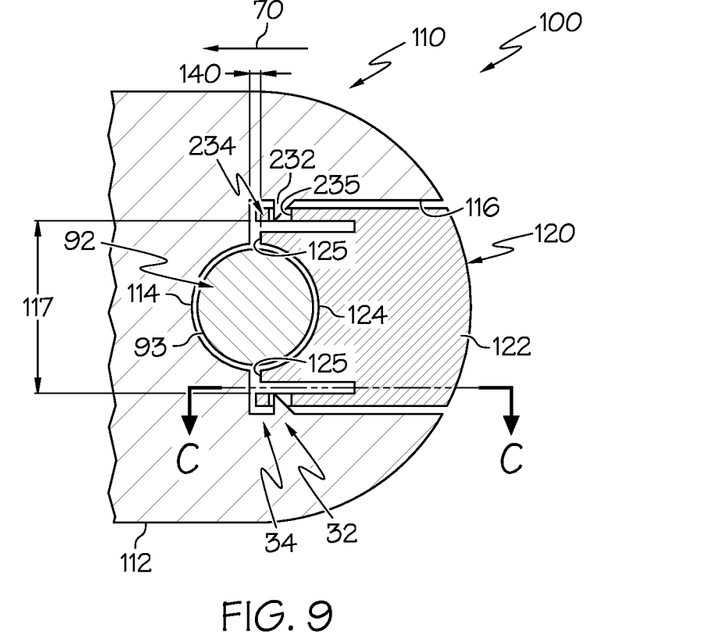
FIG. 9 schematically depicts a top sectional view of a multi-piece gear shift knob along line B-B of FIG. 5 according to one or more embodiments shown or described herein.
Figure 10:
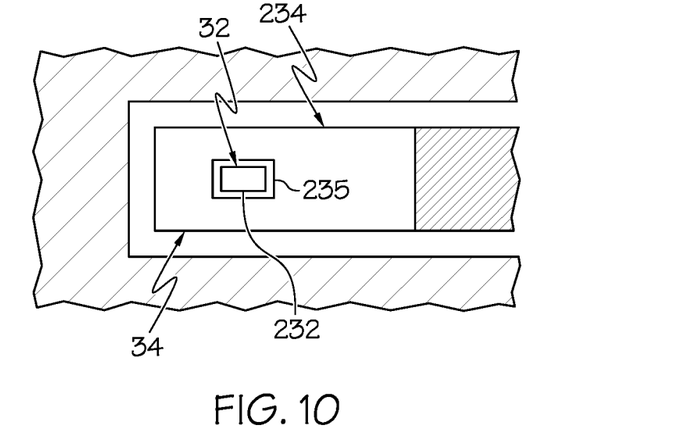
FIG. 10 schematically depicts a partial side view of the multi-piece gear shift knob along line C-C of FIG. 9 according to one or more embodiments shown or described herein.

Referring now to FIGS. 9 and 10, another embodiment of the multi-piece gear shift knob 100 is depicted. In this embodiment, the attachment features 32 of the grip portion 110 include a plurality of barbs 232 that extend from the installation opening 116. The interior spacing of the barbs 232 defines a throat dimension 117 of the grip portion 110. The region of the grip portion 110 spaced in the installation direction 70 behind the barbs 232 is the relief zone 119. The attachment features 34 of the lock portion 120 include flexible tabs 234 that extend from the lock body portion 122. The flexible tabs 234 include windows 235 into which the barbs 232 of the grip portion 110 are positioned.

As the lock portion 120 is inserted into the installation opening 116 of the grip portion 110, the attachment features 34 of the lock portion 120 interact with the attachment features 32 of the grip portion 110 to couple the lock portion 120 to the grip portion 110. As the lock portion 120 is translated in the installation direction 70 toward the grip portion 110, the flexible tabs 234 of the lock portion 120 are deflected inwards towards the lock body portion 122 by the barbs 232 to a position inside of the throat dimension 117. The flexible tabs 234 are maintained at an inward deflected position until the windows 235 of the flexible tabs 234 are positioned proximate to the barbs 232. As the windows 235 are positioned over the barbs 232, the flexible tabs 234 deflect outwards towards the unconstrained state of the flexible tabs 234. When the lock portion 120 is fully installed into the grip portion 110, at least a portion of the attachment feature 34 of the lock portion 120, here the flexible tab 234, is positioned outside of the throat dimension 117.

With the barbs 232 positioned inside the windows 235 of the flexible tabs 234, the attachment features 32, 34 couple the lock portion 120 to the grip portion 110. Further, with the lock portion 120 coupled to the grip portion 110, the partial thread forms 114, 124 of the grip portion 110 and the lock portion 120 are aligned to form the interrupted thread form 104 having the gap 140 provided between the arc end 125 of the partial thread form 124 of the lock portion 120 and the partial thread form 112 of the grip potion 110. By installing the lock portion 120 into the grip portion 110 subsequent to positioning the grip portion 110 relative to the gear shift lever 92, the interrupted thread form 104 is positioned relative to the threaded portion 93 of the gear shift lever 92 and couples the multi-piece gear shift knob 100 relative to the gear shift lever 92.

Figure 11:
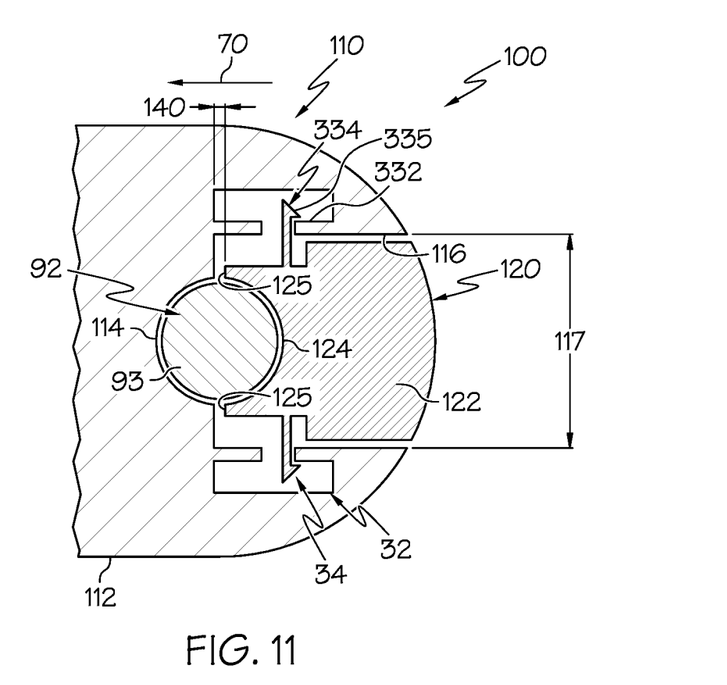
FIG. 11 schematically depicts a top sectional view of a multi-piece gear shift knob along line B-B of FIG. 5 according to one or more embodiments shown or described herein.

Referring now to FIG. 11, another embodiment of the multi-piece gear shift knob 100 is depicted. In this embodiment, the attachment features 34 of the lock portion 120 include flexible tabs 334 that extend from the lock body portion 122. The flexible tabs 334 may include barbs 335. The attachment features 32 of the grip portion 110 include a relief zone 332 spaced outside of the installation opening 116. As depicted in FIG. 11, the installation opening 116 defines a throat dimension 117 of the grip portion 110.

When the lock portion 120 is inserted into the installation opening 116 of the grip portion 110, the flexible tabs 334 deform in a direction towards the lock body portion 122 to a position inside of the throat dimension 117. As the lock portion 120 is translated towards the grip portion 110 in the installation direction 70, the flexible tabs 334 are maintained at a position inside of the throat dimension 117. The flexible tabs 334 are maintained at this position until the flexible tabs 334 are positioned proximate to the relief zone 332 of the grip portion 110. When positioned relative to the relief zone 332, the flexible tabs 334 deflect away from the lock body portion 122 of the lock portion 120 such that the flexible tabs 334 are at least partially positioned inside the relief zone 332. At least a portion of the attachment feature 34 of the lock portion 120, here a portion of the flexible tab 334, is positioned outside of the throat dimension 117. The flexible tabs 334 interact with the relief zone 332 such that the lock portion 120 is coupled to the grip portion 110, thereby forming the multi-piece gear shift knob 100.

Further, with the lock portion 120 coupled to the grip portion 110, the partial thread forms 114, 124 of the grip portion 110 and the lock portion 120 are aligned to form the interrupted thread form 104 having the gap 140 provided between the arc end 125 of the partial thread form 124 of the lock portion 120 and the partial thread form 112 of the grip potion 110. By installing the lock portion 120 into the grip portion 110 subsequent to positioning the grip portion 110 relative to the gear shift lever 92, the interrupted thread form 104 is positioned relative to the threaded portion 93 of the gear shift lever 92 and couples the multi-piece gear shift knob 100 relative to the gear shift lever 92.

While particular embodiments of the multi-piece gear shift knob 100 have been disclosed herein with specific reference to the relative positioning of the attachment features 32, 34, it should be understood that the positioning of the attachment features 32, 34 on one of the grip portion 110 or the lock portion 120 may be interchanged without departing from the scope of the disclosure.

Embodiments of the multi-piece gear shift knob 100 described herein may be made from a variety of materials including, for example and without limitation, plastics, such as acrylonitrile butadiene styrene (ABS), nylon, polyester, polyethylene (PE), polyethylene terephthalate (PET), polyvinyl chloride (PVC), and the like. In some embodiments, the material of the multi-piece gear shift knob 100 may be a composite material that includes a reinforcement material, for example and without limitation, oriented or chopped glass or carbon fiber, that is mixed with the plastic material. The materials of the multi-piece gear shift knob 100 have sufficient strength such that attachment of the multi-piece gear shift knob 100 to the threaded portion 93 of the gear shift lever 92 is secure over the usable life of the vehicle in which the multi-piece gear shift knob 100 is installed. Further, the material of the multi-piece gear shift knob 100 may provide a high-friction interface with the threaded portion 93 of the gear shift lever 92, as to resist a user from advancing the multi-piece gear shift knob 100 along the threaded portion 93 of the gear shift lever 92.

Figure 12:
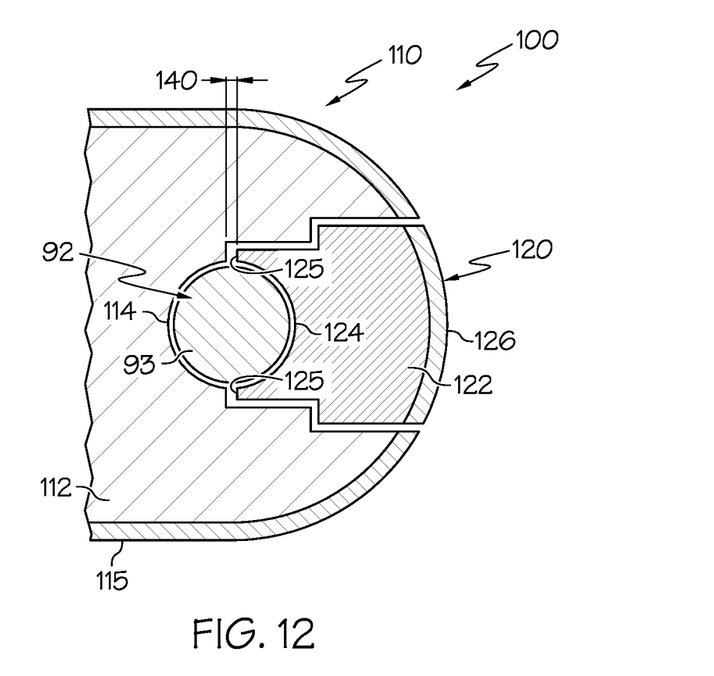
FIG. 12 schematically depicts a top sectional view of a multi-piece gear shift knob along line B-B of FIG. 5 according to one or more embodiments shown or described herein.

Referring now to FIG. 12, embodiments of the multi-piece gear shift knob 100 may include a laminated construction in which a base material is covered with garnish material. The grip portion 110 includes a grip body portion 112 that is made from a resilient material, for example, at least one of the plastic materials discussed above. The external faces of the grip body portion 112 of the grip portion 110 may be at least partially covered with a grip garnish material 115. Similarly, the lock portion 120 may include a lock body portion 122 that is made from a resilient material, for example, at least one of the plastic materials discussed above. The external faces of the lock body portion 122 of the lock portion 120 may be at least partially covered with a lock garnish material 126. The grip garish material 115 and/or the lock garnish material 126 may provide a soft grip and/or improved visual appearance over the material of the grip body portion 112 or the lock body portion 122, while continuing to implement the resilient materials of the grip body portion 112 and the lock body portion 122, which form the partial thread forms 114, 124 of the grip portion 110 and the lock portion 120, respectively. The grip garnish material 115 and/or the lock garnish material 126, therefore, provide an improved appearance while maintaining the structural consistency to secure the multi-piece gear shift knob 100 to the threaded portion 93 of the gear shift lever 92. The grip garnish material 115 and/or the lock garnish material 126 may be softer than the materials of the grip body portion 112 and the lock body portion 122, such that the grip garnish material 115 and the lock garnish material 126 provide the driver with a multi-piece gear shift knob 100 having a pleasurable tactile feel.

Examples of the grip garnish material 115 and the lock garnish material 126 include, without limitation, PVC, leather, suede, and the like. The grip garnish material 115 and/or the lock garnish material 126 may be molded over the grip body portion 112 or the lock body portion 122 in a co-molding process. Alternatively, the grip garnish material 115 and the lock garnish material 126 may be adhered to the grip body portion 112 or the lock body portion 122, respectively.

Figure 13:
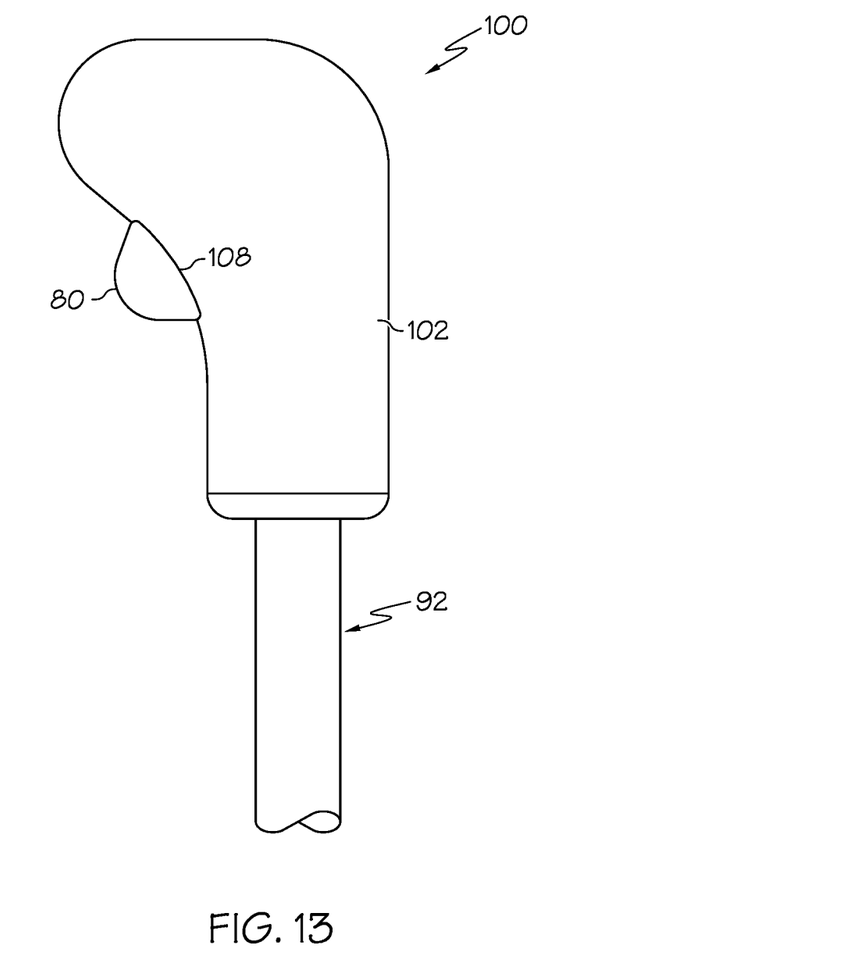
FIG. 13 schematically depicts a side view of a multi-piece gear shift knob according to one or more embodiment shown or described herein.

Referring now to FIG. 13, an embodiment of the multi-piece gear shift knob 100 installed on a gear shift lever 92 of a vehicle is depicted. The multi-piece gear shift knob 100 includes an interlock opening 108 positioned proximate to a brake-shift interlock switch 80. The interlock opening 108 passes through the external faces 102 of the multi-piece gear shift knob 100, thereby allowing a driver to actuate the brake-shift interlock switch 80. Such an interlock opening 108 may be implemented in vehicles having automatic transmissions.

It should now be understood that multi-piece gear shift knobs according to the present disclosure include a grip portion having a partial thread form and a lock portion having a partial thread form. The grip portion of the multi-piece gear shift knob may be positioned relative to threaded portion of a gear shift lever, and the lock portion may subsequently be installed into an installation opening of the grip portion, such that the partial thread forms of the grip portion and the lock portion form a interrupted thread form. The multi-piece gear shift knob may include a plurality of corresponding attachment features coupled to the grip portion and the lock portion that interlock with one another to form the multi-piece gear shift knob. Gear shift knobs according to the present disclosure may be installed onto the threaded gear shift lever of a vehicle with minimal, if any, advancing of the multi-piece gear shift knob along the gear shift lever. Such multi-piece gear shift knobs may decrease assembly time of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-piece gear shift knob comprising a grip portion and a lock portion configured to threadably connect to a gear shift lever, wherein:
   the grip portion comprises an installation opening that extends through an external face of the grip portion;
   the grip portion further comprises a partial thread form;
   the lock portion comprises a partial thread form; and
   the grip portion and the lock portion comprise corresponding attachment features such that when the lock portion is installed into the installation opening:
      the attachment features of the grip portion and the lock portion couple the lock portion to the grip portion and align the partial thread form of the lock portion with the partial thread form of the grip portion to threadably connect to a threaded portion of the gear shift lever; and
      the partial thread form of the lock portion is aligned with and spaced apart from the partial thread form of the grip portion to form an interrupted thread form with a gap provided between an arc end of the partial thread form of the lock portion and the partial thread form of the grip portion.

2. The multi-piece gear shift knob of claim 1, wherein the attachment features of the grip portion and the lock portion interlock to couple the lock portion to the grip portion.

3. The multi-piece gear shift knob of claim 1, wherein the grip portion further comprises an interlock opening passing through the external face of the grip portion.

4. The multi-piece gear shift knob of claim 1, wherein the grip portion comprises a laminate structure comprising a grip body portion and a grip garnish material positioned along an outside of the grip body portion, wherein the grip garnish material is a different material than the grip body portion.

5. The multi-piece gear shift knob of claim 1, wherein the lock portion comprises a laminate structure comprising a lock body portion and a lock garnish material positioned along an outside of the lock body portion, wherein the lock garnish material is a different material than the lock body portion.

6. The multi-piece gear shift knob of claim 1, wherein the attachment features of the grip portion and the lock portion include a plurality of flexible tabs and relief zones that interlock to couple the lock portion to the grip portion.

7. The multi-piece gear shift knob of claim 6, wherein the attachment features of one of the grip portion or the lock portion comprise barbs that deflect the flexible tabs and couple the lock portion to the grip portion.

8. The multi-piece gear shift knob of claim 1, wherein the attachment features of the lock portion comprise flexible tabs that extend from a lock body portion and deflect inwards towards the lock body portion when the lock portion is installed into the opening of the grip portion.

9. The multi-piece gear shift knob of claim 8, wherein the attachment features of the grip portion comprise a throat having a throat dimension and a relief zone, the throat being smaller than the relief zone such that when the lock portion is installed into the installation opening of the grip portion, the flexible tabs deflect outwards from the lock body portion when the flexible tabs are translated in the installation direction beyond the throat.

10. The multi-piece gear shift knob of claim 9, wherein the flexible tabs of the lock portion each comprise a barb that engages with the relief zone of the grip portion when the flexible tabs are translated in the installation direction beyond the throat to couple the lock portion to the grip portion.

11. A gear shift lever assembly for a vehicle comprising:
   a gear shift lever extending from a transmission gear selector unit, the gear shift lever having a threaded portion; and
   a multi-piece gear shift knob coupled to the gear shift lever, the multi-piece gear shift knob comprising:
      a grip portion comprising an installation opening extending through an external face of the grip portion and a partial thread form;
      a lock portion positioned within the installation opening of the grip portion, the lock portion comprising a partial thread form;
      a plurality of corresponding attachment features positioned on the grip portion and the lock portion such that when the lock portion is installed into the installation opening, the attachment features of the grip portion and the lock portion couple the lock portion to the grip portion and align the partial thread form of the lock portion with the partial thread form of the grip portion to threadably connect to a threaded portion of the gear shift lever; and the partial thread form of the lock portion is aligned with and spaced apart from the partial thread form of the grip portion to form an interrupted thread form with a gap provided between an arc end of the partial thread form of the lock portion and the partial thread form of the grip portion.

12. The gear shift lever assembly of claim 11, wherein the attachment features of the grip portion and the lock portion include a plurality of flexible tabs and relief zones that interlock to couple the lock portion to the grip portion.

13. The gear shift lever assembly of claim 12, wherein the attachment features of one of the grip portion or the lock portion comprise barbs that deflect the flexible tabs and couple the lock portion to the grip portion.

14. The gear shift lever assembly of claim 11, wherein the attachment features of the lock portion comprise flexible tabs that extend from a lock body portion and deflect inwards towards the lock body portion when the lock portion is installed into the opening of the grip portion.

15. The gear shift lever assembly of claim 14, wherein the attachment features of the grip portion comprise a throat having a throat dimension and a relief zone, the throat being smaller than the relief zone such that when the lock portion is installed into the opening of the grip portion, the flexible tabs deflect outwards from the lock body portion when the flexible tabs are translated in the installation direction beyond the throat.

16. The gear shift lever assembly of claim 15, wherein when the lock portion is installed into the grip portion, the flexible tabs of the lock portion are deflected inwards from an unconstrained state to secure the lock portion in the grip portion.

* * * * *